United States Patent [19]

Eischen et al.

[11] Patent Number: 5,327,923
[45] Date of Patent: Jul. 12, 1994

[54] VALVE FOR INSTALLATION ON A PRESSURIZED FLUID FLOW LINE

[76] Inventors: Louis P. Eischen, 1725 NW. 29th St., Oklahoma City, Okla. 73106; Ken Winders, 1554 Willow Dr., Choctaw, Okla. 73020

[21] Appl. No.: 16,919

[22] Filed: Feb. 12, 1993

[51] Int. Cl.⁵ .................. F16K 43/00; F16L 41/04; B23B 41/08
[52] U.S. Cl. .................. 137/15; 137/318; 222/83; 408/67; 408/83.5; 408/207
[58] Field of Search .......... 137/15, 318; 408/67, 408/68, 83.5, 87, 92, 99, 100, 101, 102, 104, 204, 207, 97, 115 B, 115 R; 222/81, 83, 83.5; 285/197, 158, 199

[56] References Cited

U.S. PATENT DOCUMENTS

| | | | |
|---|---|---|---|
| 3,703,906 | 11/1972 | Tickett | 137/318 |
| 3,799,182 | 3/1974 | Long | 137/318 |
| 3,863,667 | 2/1975 | Ward | 137/318 |
| 3,948,282 | 4/1976 | Yano | 137/318 |
| 4,516,598 | 5/1985 | Stupak | 137/318 |
| 4,552,170 | 11/1985 | Margrave | 137/318 |
| 4,628,955 | 12/1986 | Smith | 137/318 |
| 4,680,848 | 7/1987 | Goldner | 29/213 R |
| 4,682,624 | 7/1987 | Turner | 137/318 |
| 4,809,735 | 3/1989 | Volgstadt et al. | 137/318 |
| 4,955,406 | 9/1990 | Antoniello | 137/318 |
| 5,058,620 | 10/1991 | Jiles | 137/318 |
| 5,074,526 | 12/1991 | Ragsdale et al. | 251/267 |
| 5,076,311 | 12/1991 | Marschke | 137/15 |
| 5,105,844 | 4/1992 | King, Sr. | 137/15 |
| 5,183,364 | 2/1993 | Hardwig | 137/318 |

*Primary Examiner*—George L. Walton
*Attorney, Agent, or Firm*—Dunlap, Codding & Lee

[57] ABSTRACT

A valve for installation on a flow line while the flow line is under pressure. The valve includes a two-part valve body and a valve cartridge. Each body portion has a semi-cylindrical channel sized to mate with the flow line. The body portions are secured together with a portion of the flow line enclosed and sealed in the channels of the body portions. A throughbore extends through the two body portions and fully intersects the channels of the two body portions. One end of the throughbore is adapted for attachment of a cutting tool, which is used to cut out the portion of the flow line disposed in the throughbore. After the flow line is cut, the valve cartridge is directed into operating position. A valve stem nut, a valve cap, a valve plug, gaskets, seals and connectors are provided to close and seal both ends of the throughbore.

18 Claims, 5 Drawing Sheets

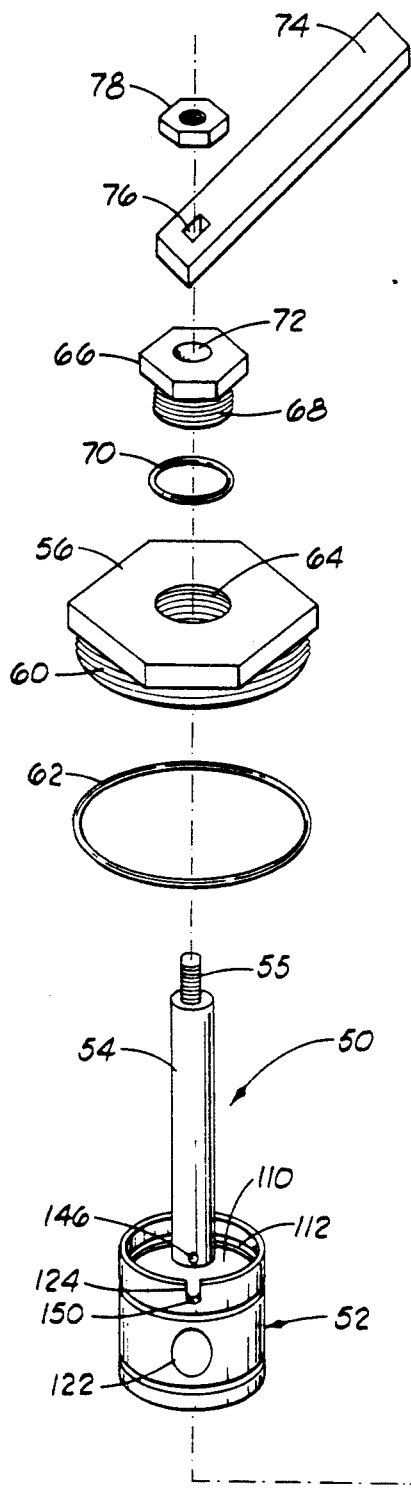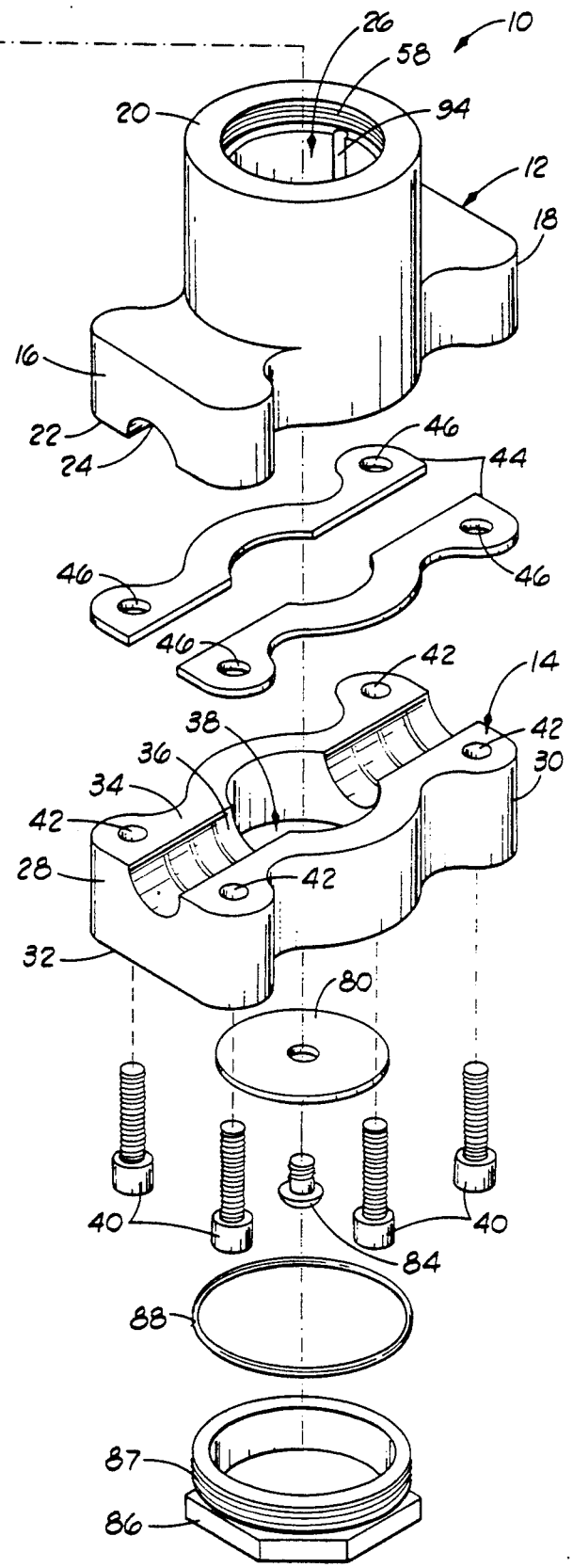
FIG. 1

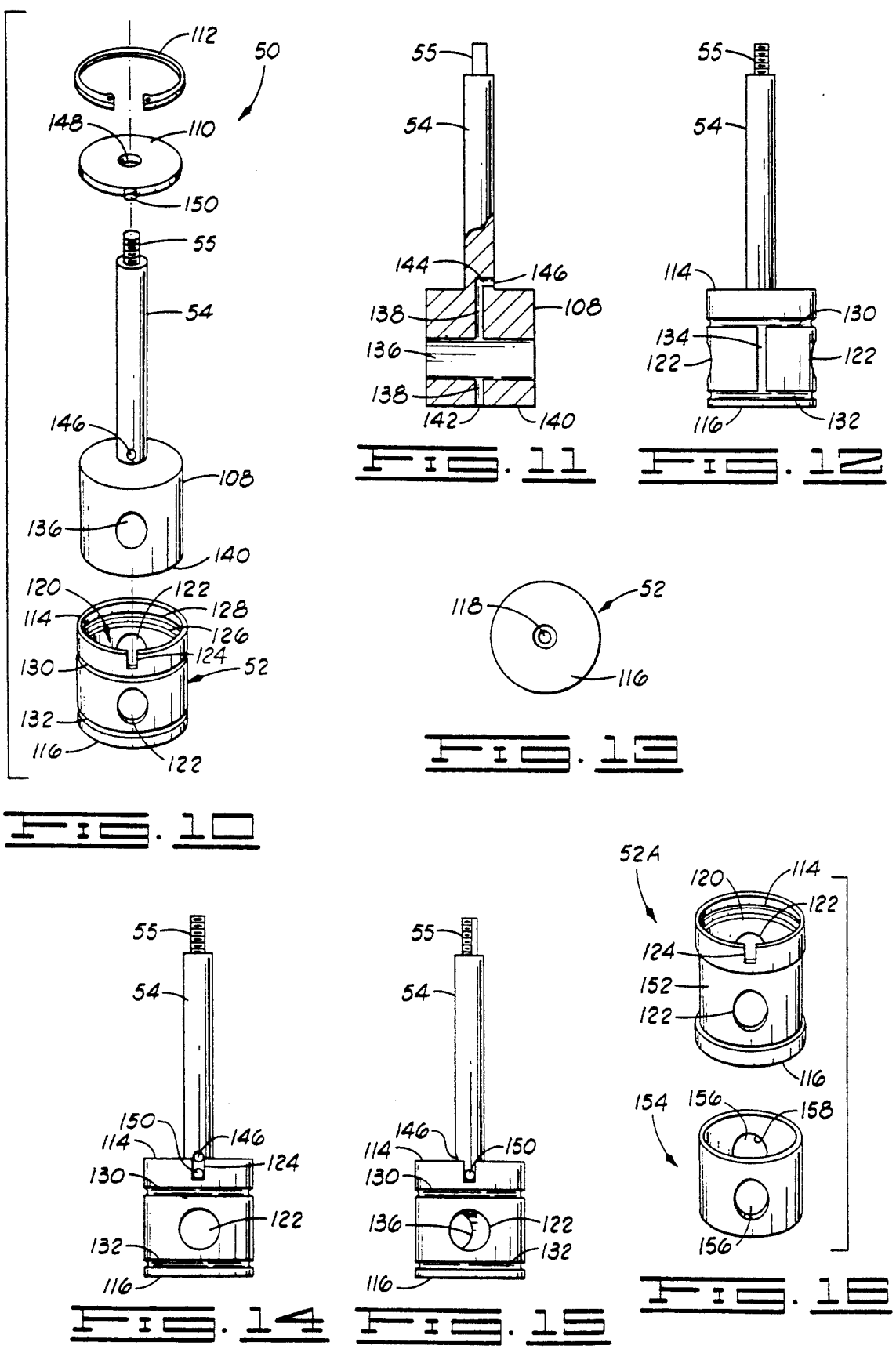

VALVE FOR INSTALLATION ON A PRESSURIZED FLUID FLOW LINE

BACKGROUND OF THE INVENTION

1. Field of the Invention

The present invention relates generally to flow valves and particularly, but not by way of limitation, to a cut-off valve which may be installed on a fluid flow line while the line is under pressure.

2. Description of Related Art

In repairing or modifying the plumbing in a building, it is often necessary to shut off flow before proceeding with the work. Ideally, only the flow to the immediate work area would be shut off and all other plumbing would remain in service. However, there is often no shut-off valve at a point in the flow line which can be closed and cause minimal interruption of service. In such a case, flow must be shut off at the nearest upstream valve and service is interrupted at points other than the immediate work area.

U.S. Pat. No. 4,552,170 issued to Margrave discloses a valve which can be inserted in an existing line without disconnection of the line. The Margrave valve, which functions like a gate valve, is closed by rotating a threaded valve stem to position an expandable seal across the line.

One drawback to the Margrave valve is the wear on the expandable seal. As the valve is opened and closed, the expandable seal is exposed to wear against the cut portion of the line and the body of the valve.

Another problem with the Margrave valve is the difficulty in providing sufficient cutting force to cut through the line and in overcoming the fluid pressure of the line during the cutting process.

SUMMARY OF THE INVENTION

The present invention is a valve which may be installed on a fluid flow line while the flow line is pressurized. The valve includes a valve body having first and second body portions which define a channel for receiving the flow line. The first and second body portions have first and second bores, respectively, which cooperate to define a throughbore extending through the valve body and intersecting with the channel. A valve cartridge is inserted into the throughbore and into the channel through the first body portion. The second body portion has a valve tool opening into the throughbore for cutting the flow line and for replacement of the valve cartridge.

The valve cartridge includes a valve sleeve, a valve cylinder and a valve stem extending from the valve cylinder. The valve sleeve has a pair of diametrically opposed flow openings which are substantially aligned with the flow of the line when the valve sleeve is secured within the throughbore. The valve cylinder has a flow bore through it and is rotatably positioned within the valve sleeve. The valve stem protrudes from the valve body to allow rotation of the valve cylinder.

The valve is open when the flow bore of the valve cylinder is in fluid communication with the flow openings of the valve sleeve. Conversely, the valve is closed when the flow bore of the valve cylinder does not intersect with the flow openings of the valve sleeve.

Connections, gaskets and seals are provided to effect a fluid seal of the valve body with the flow line. A valve cap is attached to the first body portion and a valve plug is secured to the second body portion to seal each end of the throughbore.

One object of the present invention is to provide a valve which may be installed on a flow line while the line is pressurized.

Another object of the present invention is to provide a valve which overcomes the difficulty in cutting against the fluid pressure of the flow line.

Yet another object of the present invention is to provide a valve constructed to be a permanent component of the flow line and which can be opened and closed repeatedly without excessive wear.

Still another object of the present invention is to provide a valve which is designed for easy replacement of the valve cartridge and fluid seals.

Other objects, features and advantages of the present invention are apparent from the following detailed description when read in conjunction with the accompanying drawings and appended claims.

BRIEF DESCRIPTION OF THE DRAWINGS

FIG. 1 is an exploded perspective view of a valve constructed in accordance with the present invention.

FIG. 10 is an exploded perspective view of the valve cartridge of the valve of FIG. 1.

FIG. 11 is a partly sectional view of the valve cylinder and stem of the valve cartridge of FIG. 10.

FIG. 12 is a side elevation of the valve cartridge of FIG. 10.

FIG. 13 is a bottom plan view of the valve cartridge of FIG. 12.

FIG. 14 is a side elevation of the valve cartridge of FIG. 10 in the fully open position.

FIG. 15 is a side elevation of the valve cartridge of FIG. 10 in a partially closed position.

FIG. 16 is an exploded perspective view of an alternate embodiment for the valve sleeve of FIG. 10.

DETAILED DESCRIPTION OF THE PREFERRED EMBODIMENTS

Figure 2:
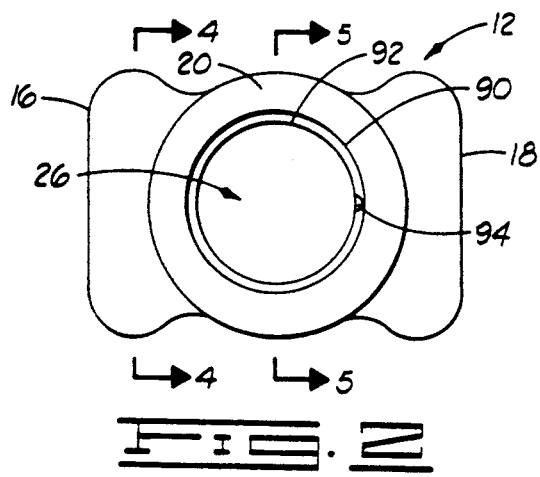
FIG. 2 is a top plan view of the first body portion of the valve of FIG. 1.

Referring to the drawings in general and to FIG. 1 in particular, shown therein and designated by the general reference numeral 10 is a valve for installation on a flow line while the line is under pressure. The valve 10 comprises a two-part body having a first body portion 12 and a second body portion 14.

The first body portion 12 has opposite ends 16 and 18, an upper end 20, and a lower end 22 having a first channel 24. The first channel 24 extends from end 16 to end 18 of the first body portion 12 and is substantially semi-cylindrical in shape. In addition, the first body portion 12 has a first bore 26 which extends from the upper end 20 to the lower end 22 and communicates with the first channel 24.

The second body portion 14 has opposite ends 28 and 30, a lower end 32 and an upper end 34 having a second channel 36. The second channel 36 extends from end 30 to end 32 of the second body portion 14 and is substantially semi-cylindrical in shape. A second bore 38 extends from the upper end 34 to the lower end 32 and intersects the second channel 36.

The first and second channels 24 and 36 are adapted to mate with each other around the particular diameter of flow line (not shown in FIG. 1) to be valved. The first and second body portions 12 and 14 may be secured together around the flow line in any suitable manner.

Typically, a plurality of threaded bolts 40 are used to join the body portions 12 and 14 together. The second body portion 14 is provided with a plurality of countersunk bolt bores 42 which align with a corresponding plurality of threaded bolt holes (not shown in FIG. 1) in the lower end 22 of the first body portion 12. Each bolt 40 is inserted through one of the bolt bores 42 of the second body portion 14 and screwed into a corresponding one of the threaded bolt holes in the second body portion 12.

In the connection of the body portions 12 and 14, any suitable liquid gasket seal may be applied between the first and second body portions 12 and 14 to provide a fluid-tight seal therebetween. In the alternative, a split gasket 44 of elastomeric or other suitable gasket material may be provided. The split gasket 44 is shaped to fit between the first and second body portions 12 and 14 and has a plurality of holes 46 therethrough for insertion of the securing bolts 40.

It should be appreciated that the first bore 26 and the second bore 38 cooperate to define a throughbore in the valve 10. As illustrated by FIG. 1, the valve 10 also includes a valve cartridge 50, which is adapted for mating insertion into the throughbore defined by the first bore 26 and second bore 38. The valve cartridge 50 includes a valve sleeve 52, a valve cylinder (not visible in FIG. 1) fitted within the valve sleeve 52 and a valve stem 54 extending from the valve cylinder. The valve stem 54 has an upper threaded portion 55, which is flat on two opposite sides.

A valve cap 56 is provided to cover the first bore 26. The upper end of the first bore 26 has a set of threads 58 and the valve cap 56 has a mating set of threads 60 to secure the valve cap 56 to the first body portion 12 over the first bore 26. A valve cap seal 62, such as an elastomeric o-ring, is positioned between the first body portion 12 and the valve cap 56 to achieve a fluid-tight seal therebetween.

A valve stem bore 64 extends through the valve cap 56 to receive the valve stem 54. The upper end of the valve stem bore 64 is threaded and a valve stem nut 66 has a mating set of threads 68 to secure the valve stem nut 66 to the valve cap 56. A seal 70, such as an elastomeric o-ring seal is positioned between the valve stem nut 66 and the valve cap 56 to provide a fluid-tight seal therebetween.

The valve stem nut 66 has a valve stem bore 72 to receive the valve stem 54. A valve handle 74 with a rectangular slot 76 is provided for rotating the valve stem 54 and valve cylinder. The rectangular slot 76 is sized and shaped to mate with the upper threaded end 55 of the valve stem 54. The flat sides of the upper threaded end 55 of the valve stem 54 and the rectangular slot 76 cause the valve stem 54 to turn in response to rotation of the handle 74. A valve handle nut 78 is threaded onto the upper end of the valve stem 54 to secure the valve handle 74 to the valve stem 54.

After the valve cartridge 50 is installed in the throughbore defined by the first bore 26 and the second bore 38, a retainer ring 80, and a retainer screw 84 are used to prevent upward movement of the valve cartridge 50. The retainer screw 84 mates with threads (not shown in FIG. 1) in the bottom of the valve sleeve 52.

Finally, a valve plug 86 having a set of threads 87 is screwed into a mating set of threads (not shown in FIG. 1) in the lower end of the second bore 38 to cover the second bore 38. A suitable seal 88, such as an elastomeric o-ring seal, is positioned between the second body portion 14 and the valve plug 86 to provide a fluid seal therebetween.

Figure 3:
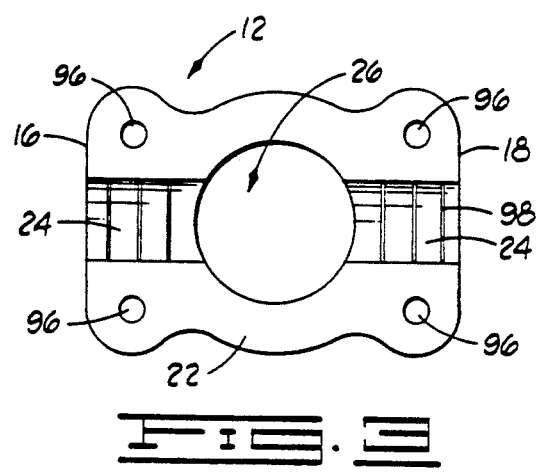
FIG. 3 is a bottom plan view of the first body portion of FIG. 2.
Figure 4:
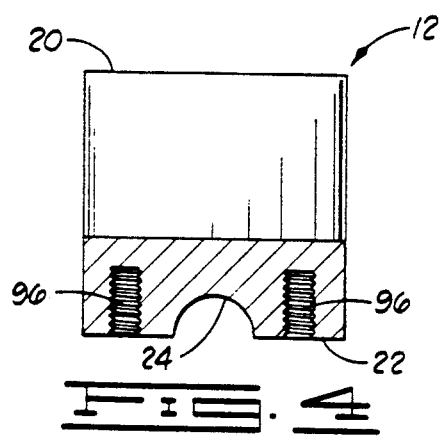
FIG. 4 is a cross-sectional view of the first body portion taken along the lines 4—4 of FIG. 2.
Figure 5:
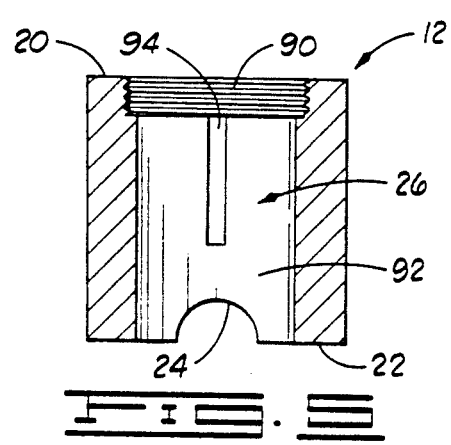
FIG. 5 is a cross-sectional view of the first body portion taken along the lines 5—5 of FIG. 2.

Turning now to FIGS. 2 through 5, the first body portion 12 of the valve 10 is described in greater detail. As best shown in FIGS. 2 and 5, the first bore 26 has an upper, threaded outerbore 90 for receiving the valve cap 56 and a machined inner bore 92 extending from the threaded outerbore 90 to the lower end 22 of the first body portion 12. A guide groove 94 is located in the wall of the first body portion 12 in the first bore 26. As best illustrated by FIG. 5, the guide groove 94 extends downward from the bottom of the threaded outerbore 90 to a medial point of the inner valve bore 92. The purpose of the guide groove 94 is explained in detail hereinafter.

As shown in FIGS. 3 and 4, the lower end 22 of the first body portion 12 includes a plurality of threaded bolt holes 96 used for securing the first body portion 12 and the second body portion 14 together. As illustrated by FIG. 3, the channel 24 of the first body portion 12 includes a plurality of transverse knurls or ridges for biting into the flow line and improving the grip of the first body portion 12 on the flow line. One of the transverse knurls is designated by reference number 98 and is generally representative of the transverse knurls protruding from the first channel 24.

Figure 6:
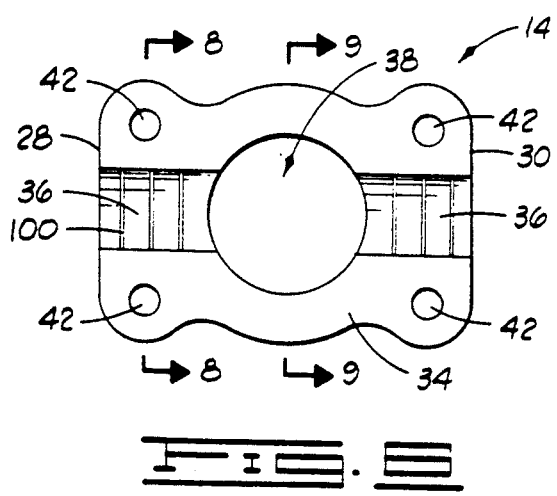
FIG. 6 is a top plan view of the second body portion of the valve of FIG. 1.
Figure 7:
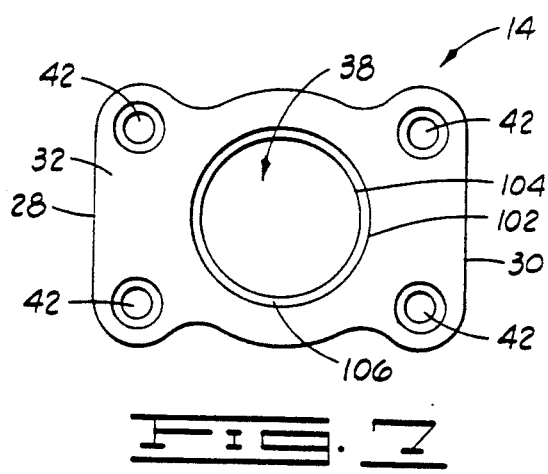
FIG. 7 is a bottom plan view of the second body portion of FIG. 6.
Figure 8:
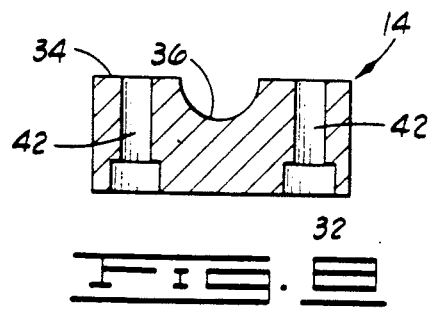
FIG. 8 is a cross-sectional view of the second body portion taken along the lines 8—8 of FIG. 6.

With reference to FIGS. 6 through 9, the second body portion 14 of the valve 10 is described in greater detail. As shown in FIGS. 6 through 8, the countersunk bolt bores 42 extend through the second valve body 14 for insertion of the securing bolts 40.

As best illustrated by FIG. 6, the channel 36 of the second body portion 14 has a plurality of transverse knurls or ridges for biting into the flow line and improving the grip of the second body portion 14 on the flow line. One of the transverse knurls is designated by reference numeral 100 and is generally representative of the transverse knurls protruding from the second channel 36.

Figure 9:
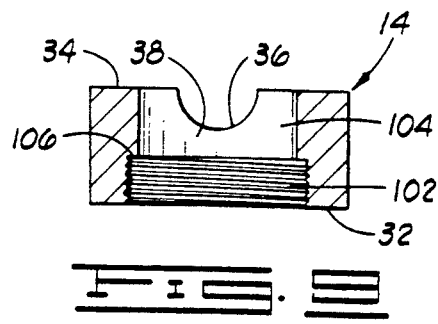
FIG. 9 is a cross-sectional view of the second body portion taken along the lines 9—9 of FIG. 6.

As best shown in FIG. 9, the second bore 38 has a lower, threaded outerbore 102 for receiving the valve plug 86 and a machined inner bore 104. The threaded outerbore 102 and the inner bore 104 define an annular wall 106 facing the lower end 32 of the second body portion 14. The retainer ring 80 is sized to engage the annular wall 106 and prevent upward movement of the valve cartridge 50 after installation.

Referring now to FIGS. 10 through 16, the valve cartridge 50 is described in greater detail. As best shown in FIG. 10, the valve cartridge 50 comprises the valve sleeve 52, the valve stem 54 and cylinder 108, a ring plate 110, and a split ring 112.

As best illustrated by FIGS. 10 and 13, the valve sleeve 52 is cylindrical in shape and has an open upper end 114, a lower end with a threaded bore 118 for receiving the retainer screw 84, and a valve chamber 120 extending from the upper end 114 toward the lower end 116 for receiving the valve cylinder 108. The valve sleeve 52 and valve cylinder 108 are machined to fit tightly enough to provide a fluid seal between them. In using the valve 10 on a water pipe, for example, the valve sleeve 52 and valve cylinder 108 are typically machined to fit within a tolerance of one-thousandth of an inch. For easier rotation of the valve cylinder 108 within the valve chamber 120, the walls of the valve chamber 120 may be coated with "TEFLON," or a similar substance.

A pair of diametrically opposed flow openings 122 are made in the valve sleeve 52 and communicate with the valve chamber 120. A guide notch 124 is located at the upper end 114 of the valve sleeve 52 and is aligned with one of the flow openings 122 into the valve chamber 120.

The valve chamber 120 reduces in diameter between the upper end 114 and the flow openings 122 to form an annular shoulder 126. The ring plate 110 is sized to rest upon the annular shoulder 126.

Within the valve chamber 120 between the annular shoulder 126 and the upper end 114, an annular groove 128 is provided to receive the split ring 112. The annular groove 128 is positioned such that the split ring 112 holds the ring plate 110 and valve cylinder 108 in proper position within the valve chamber 120.

An upper groove 130 extends around the valve sleeve 52 between the upper end 114 and the flow openings 122 of the valve sleeve 52. The upper groove 130 is sized and shaped to receive an elastomeric seal (not shown) which prevents fluid leakage between the valve sleeve 52 and the first body portion 12 when the valve 10 is installed.

In similar fashion, a lower groove 132 extends around the valve sleeve 52 between the lower end 116 and the flow openings 122. The lower groove 132 is adapted to receive an elastomeric seal (not shown) which prevents fluid leakage between the valve sleeve 52 and the second body portion 14 when the valve 10 is installed.

As best shown in FIG. 12, a pair of diametrically opposed side grooves are located on the outer surface of the valve sleeve 52 at a ninety degree orientation from the flow openings 122. One of the side grooves is designated by reference numeral 134 and is generally representative of the two side grooves of the valve sleeve 52. Each side groove 134 intersects with the upper groove 130 and the lower groove 132 and is adapted to receive an elastomeric seal (not shown) to prevent fluid leakage around the side wall of the valve sleeve 52 between the first and second body portions 12 and 14.

With reference now to FIGS. 10 and 11, the valve cylinder 108 is typically a solid cylinder with two bores therethrough. The first bore, a flow bore 136 extends transversely through the valve cylinder 108 and is sized and positioned to communicate fully with the flow openings 122 of the valve sleeve 52 when rotated to align with the flow openings 122.

As best shown in FIG. 11, the second bore is a bleed-off bore 138 extending from the lower end 140 of the valve cylinder 108 into the valve stem 54. The bleed-off bore 138 has a lower orifice 142 which communicates with the threaded bore 118 in the lower end 116 of the valve sleeve 52 when the valve cylinder 108 is installed in the valve chamber 120 of the valve sleeve 52. The upper end of the bleed-off bore 138 terminates in a crossbore 144 and an upper orifice 146 in the valve stem 54.

The remaining components of the valve cartridge 50 are the ring plate 110 and the split ring 112. The ring plate 110 is basically a flat cylindrical plate having a central valve stem opening 148 and a guide nub 150 which extends radially from the ring plate 110. The guide nub 150 is sized and shaped to slide into the guide notch 124 of the valve sleeve 52 and to protrude radially from the outer periphery of the valve sleeve 52.

The split ring 112 is positioned on top of the ring plate 110 and is sized and shaped to snap into the split ring groove 128 of the valve sleeve 52. The placement of the split ring 112 within the split ring groove 128 secures the components of the valve cartridge 50 together.

The assembled valve cartridge 50 is shown in FIGS. 14 and 15. In the fully open position illustrated by FIG. 14, the upper orifice 146 of the valve stem 54, the guide nub 150 and one of the flow openings 122 of the valve sleeve 52 face the same direction. In addition, the flow bore 136 of the valve cylinder 108 is aligned with the flow openings 122 of the valve sleeve 52 to define a flow path through the valve cartridge 50.

A partially closed position of the valve cartridge 50 is shown in FIG. 15. In this position, the valve stem 54 and cylinder 108 are out of alignment with the flow openings 122 of the valve sleeve 52 while the guide nub 150 and entire valve sleeve 52 remain in the same position as shown in FIG. 14. With this construction, the valve 10 is opened and closed without any movement of the valve sleeve 52. Consequently, the elastomeric seals in the upper, lower and side grooves 130, 132 and 134 are not subjected to wear from opening and closing the valve 10.

An alternate embodiment for the valve sleeve 52, designated by reference numeral 52A, is illustrated by FIG. 16. The valve sleeve 52A has a medial recessed area 152 in place of the upper, lower and side grooves 130, 132 and 134. An elastomeric sleeve 154 is provided to fit snugly into the recessed area 152 of the valve sleeve 52A. The elastomeric sleeve 154 has a pair of flow openings 156 sized and located to align with the flow openings 122 of the valve sleeve 52A.

The elastomeric sleeve 154 may include an annular flange 158 which extends inwardly from each flow opening 156 of the elastomeric sleeve 154 to engage the wall of the valve sleeve 52A around the corresponding flow opening 122. The snug fit of the elastomeric sleeve 154 and the engagement of the annular flanges 158 with the valve sleeve 52A walls around the flow openings 122 hold the elastomeric sleeve 154 in place. A suitable adhesive also could be used to secure the elastomeric sleeve 154 to the valve sleeve 52A. The elastomeric sleeve 154 prevents fluid leakage between the valve sleeve 52A and the first and second body portions 12 and 14 in a manner similar to that described for the elastomeric seals in the grooves 130, 132 and 134 of the valve sleeve 52.

In both of the valve sleeve embodiments 52 and 52A, the valve 10 is designed to be a full-bore valve. When the valve 10 is fully open, the valve sleeve 52 or 52A and the valve cylinder 108 do not lessen the fluid flow through the flow line.

The various components of the valve 10 may be constructed of any suitable material used to make valves. Typically, the valve stem 54 and cylinder 108 are made of stainless steel and the other major components of the valve 10 are brass.

Figures 17, 18, 19:
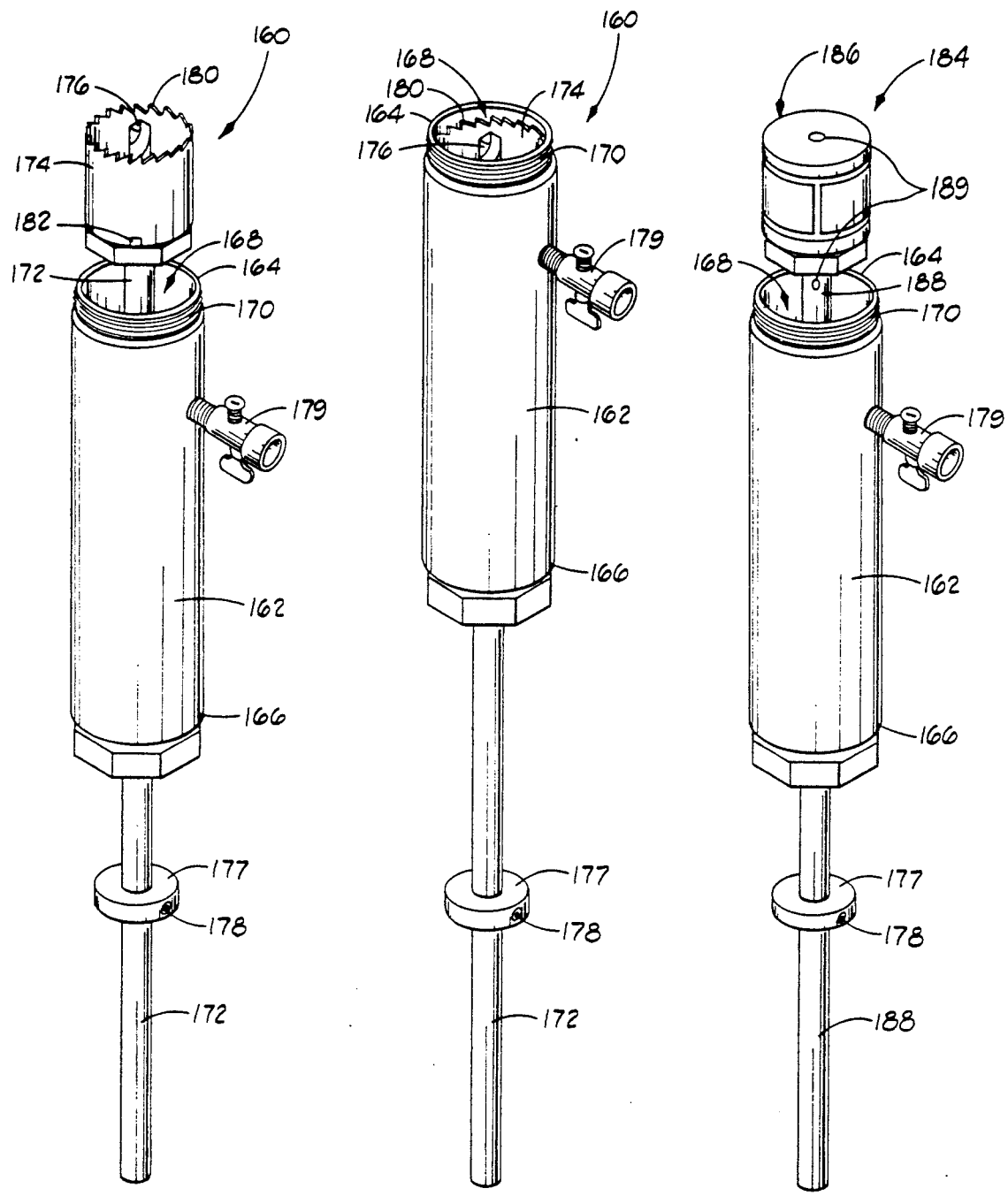
FIG. 17 is a perspective view of a cutting tool for use with the valve of FIG. 1 with the cutting element in an extended position.
FIG. 18 is a perspective view of the cutting tool of FIG. 17 with the cutting element in a retracted position.
FIG. 19 is a perspective view of a displacing tool for use with the valve of FIG. 1.

Turning now to FIGS. 17 and 18, a cutting tool 160 for use in installing the valve 10 on a flow line is described. The cutting tool 160 includes a housing 162 having an upper end 164 and a lower end 166. The upper end 164 of the housing 162 opens into a cutting tool chamber 168 and has a set of threads 170 for attaching the cutting tool 160 to the threaded outer bore 102 of the second body portion 14 of the valve 10.

A shaft 172 extends through the lower end 166 of the housing 162 and into the cutting tool chamber 168. The lower end 166 of the housing 162 is provided with a suitable fluid seal around the shaft 172. A cutting element 174 and pilot bit 176 are attached to the upper end of the shaft 172. The shaft 172 is adapted to telescope through the housing 162 between an extended position (FIG. 17) and a retracted position (FIG. 18). It should be appreciated that in the retracted position (FIG. 18), the cutting element 174 and pilot bit 176 are completely contained within the cutting tool chamber 168.

Toward the lower end of the shaft 172, a stop 177 is journaled onto the shaft 172. A set screw 178 is threaded into the stop 177 to secure the stop 177 in a selected position on the shaft 172. With this construction, the stop 177 may be positioned on the shaft 172 at a predetermined location to limit the extension of the cutting element 174.

A conventional bleed-off valve 179 is mounted to the housing 162 and communicates into the cutting tool chamber 168. By opening the bleed-off valve 179, any fluid pressure within the cutting tool chamber 168 may be relieved.

As shown in FIG. 17, the cutting element 174 and pilot bit 176 are basically a hole-saw having a plurality of saw-teeth designed to cut through metal. One of the saw-teeth is designated by reference numeral 180 and is generally representative of the saw-teeth of the cutting element 174.

Toward the lower end of the cutting element 174, a plurality of bleed-off holes extend through the cutting element 174 to allow fluid to pass from the interior of the cutting element 174 into the cutting tool chamber 168. One of the bleed-off holes is designated by reference numeral 182 and is generally representative of the bleed-off holes through the cutting element 174.

It should be appreciated that the lower end of the shaft 172 is adapted for attachment of a drill for rotating the shaft 172, cutting element 174 and pilot bit 176 to cut the flow line.

Referring to FIG. 19, a displacing tool 184 for use in replacing the valve cartridge 50 of the valve 10 is described. The displacing tool 184 is identical to the cutting tool 160, except for a few modifications.

The cutting element 174 and pilot bit 176 of the cutting tool 160 are replaced by a displacing element 186. The displacing element 186 has the same size, shape, and grooves for seals as the valve sleeve 52 of the valve cartridge 50 to be replaced. The displacing element 186, however, has solid side walls so that no flow may take place through the displacing element 186 when it is positioned in the flow line.

In addition, the displacing tool 184 has different shaft 188 from the cutting tool 160. A bleed-off bore 189 extends into the displacing tool shaft 188 and up through the center of the displacing element 186. The bleed-off bore 189 allows fluid to flow from above the displacing element 186 and into the housing chamber 168 of the displacing tool 184.

It should be appreciated that an alternate displacing element (not shown) may be constructed like the alternate valve sleeve 52A, except that neither the alternate displacing element nor its elastomeric sleeve should have flow openings.

Installation and Operation of the Valve

Turning now to FIGS. 20 through 23, the installation of the valve 10 on a flow line 190 is described. In these drawing figures, the flow line 190, the first and second body portions 12 and 14, and the valve cap 56 are shown in sectional views. Gasket material between the first and second body portions 12 and 14 and all of the elastomeric seals are omitted for clarity of illustration.

Figure 20:
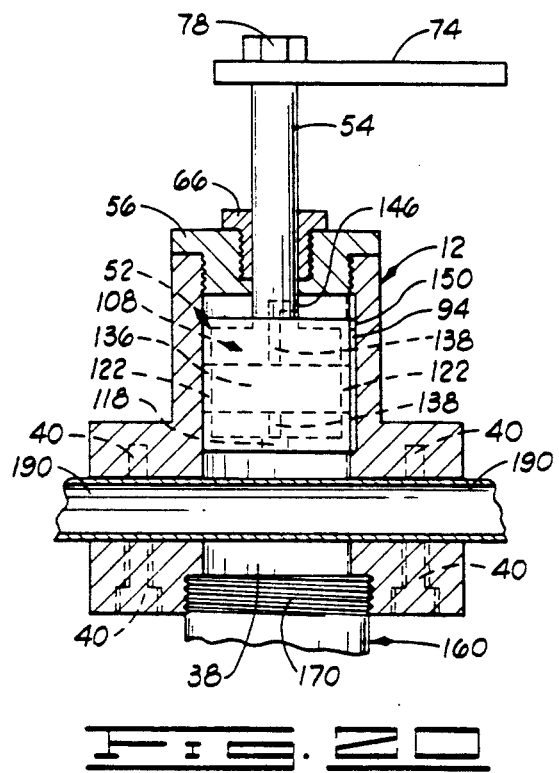
FIG. 20 is a partly sectional view of the valve of FIG. 1 connected to a flow line with the cutting tool attached. In this figure, the cutting element of the cutting tool is retracted.

As shown in FIG. 20, the first and second body portions 12 and 14 are secured together with securing bolts 40 around the flow line 190. The first and second channels 24 and 36 cooperate to mate with the flow line 190. At this stage of installation, the valve cartridge 50 is in an upper position above the flow line 190 and entirely within the first bore 26 of the first body portion 12.

After attachment of the first and second body portions 12 and 14 to the flow line 190, the upper end 164 of the cutting tool 160 is screwed into the threaded outer bore 102 of the second body portion 14.

Figure 21:
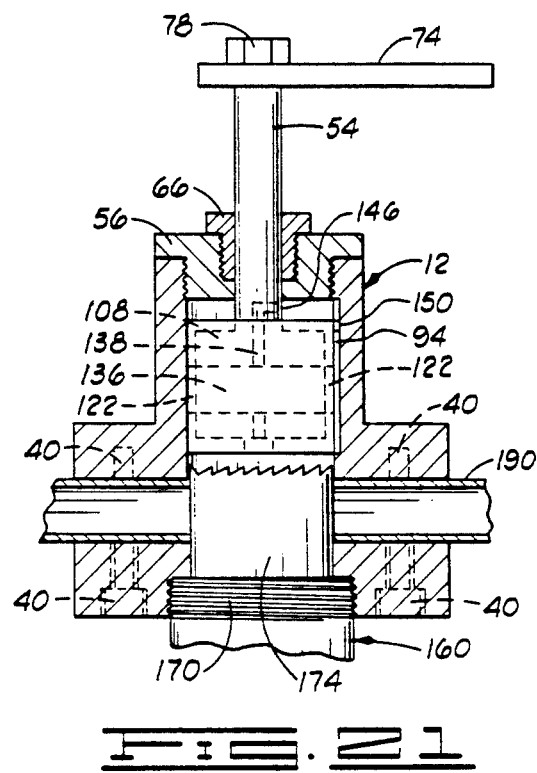
FIG. 21 is the same view as FIG. 20, but with the cutting element extended after cutting through the flow line.

A drill is connected to the shaft 172 of the cutting tool 160 and the cutting element 174 is rotated and extended to cut through the flow line 190, as illustrated by FIG. 21. Of course, upon cutting through the flow line 190, the first bore 26, second bore 38 and cutting tool chamber 168 are subjected to the fluid pressure of the flow line 190.

After the cut is made through the flow line 190, fluid pressure is communicated through the threaded bore 118 of the valve sleeve 52, the lower orifice 142, bleed-off bore 138, crossbore 144 and upper orifice 146 to equalize fluid pressure above and below the valve sleeve 52 and valve cylinder 108. This equalization of fluid pressure facilitates the downward insertion of the valve cartridge 50 into the proper operating position.

After the flow line 190 has been cut, the cut-out portion of the flow line 190 is contained within the cutting element 174 and is pierced by the pilot bit 176. Next, the cutting element 174 is retracted into the housing chamber 168. The cut-out portion of the flow line 190, retained in the cutting element 174 by friction, fluid pressure and the penetration of the pilot bit 176, accompanies the cutting element 174 into the housing chamber 168.

Figure 23:
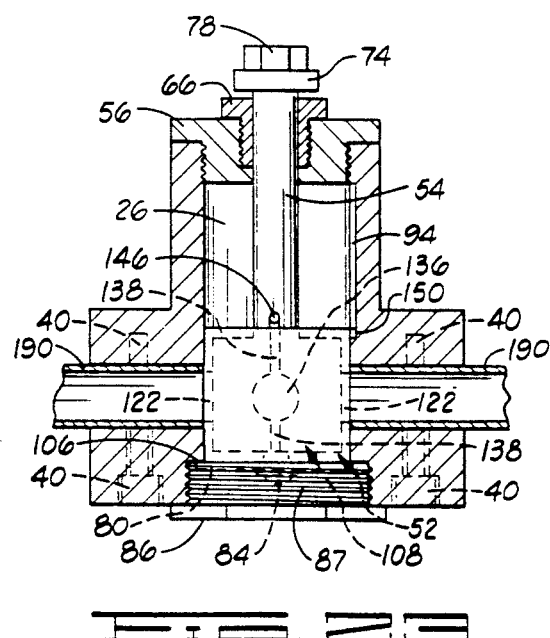
FIG. 23 is the same view as FIG. 22, but with the valve in the fully closed position.

Then the valve cartridge 50 is pushed downward into the operating position and is rotated into the shut-off position to shut off fluid flow in the flow line 190. The shut-off position of the valve 10 is illustrated by FIG. 23.

It should be appreciated that, as the valve cartridge 50 is pushed downward, the protrusion of the guide nub 150 into the guide groove 94 assures alignment of the flow openings 122 with the flow direction of the flow line 190. Before the valve cartridge 50 is pushed down, the guide nub 150 is at the top of the guide groove 94 (FIGS. 20 and 21). After movement into the operating position, the guide nub 150 is at the bottom of the guide groove 94 (FIGS. 22 and 23).

At this point, flow is cut off but fluid pressure exists in the housing chamber 168 of the cutting tool 160 and in the throughbore defined by the bores 26 and 38. This fluid pressure is bled off by opening the bleed-off valve 179 of the cutting tool 160. The bled-off fluid is deposited in a bucket or other suitable receptacle through a hose attached to the bleed-off valve 179.

With the fluid pressure relieved, the cutting tool 160 is unscrewed and removed from the second body portion 14. The retainer ring 80, retainer screw 84, retainer seal 88 and valve plug 86 are then installed to achieve a fluid-tight seal over the second bore 38.

Figure 22:
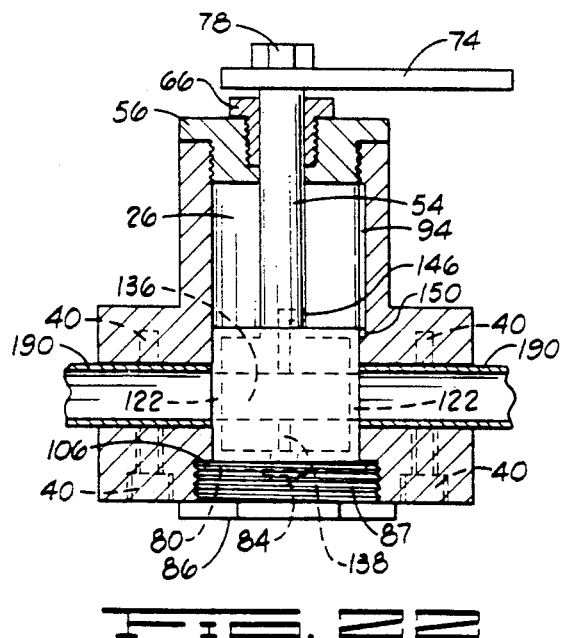
FIG. 22 is the same view as FIG. 20, except that the cutting tool is removed and the tool opening of the valve is sealed and covered. In this figure, the valve is in the fully open position.

The retainer ring 80 abuts the annular wall 106 of the second body portion 14 to prevent movement of the valve cartridge 50 upward out of the proper operating position (FIGS. 22 and 23). In order to keep the valve cartridge 50 from moving downward out of operating position, the valve plug 86 engages the bottom face of the retainer ring 80.

It should be appreciated that the retainer screw 84 effects a fluid-tight seal of the bore 118. Accordingly, there is no fluid pressure below the valve cartridge 50 after the valve 10 is completely installed on the flow line 190.

In operation, the fully open position of the valve 10 is shown in FIG. 22. The flow openings 122 of the valve sleeve 52 and the flow bore 136 of the valve cylinder 108 are in full fluid communication with the flow of the flow line 190.

A closed position of the installed valve 10 is illustrated by FIG. 23. The handle 74 and valve stem 54 and cylinder 108 are rotated such that the flow bore 136 of the valve cylinder 108 is perpendicular to the flow of the flow line 190. Accordingly, the valve cylinder 108 cuts off flow in the flow line 190.

It should be appreciated that the valve sleeve 52 is held stationary by the protrusion of the guide nub 150 into the guide groove 94 of the first body portion 12. Thus the flow openings 122 of the valve sleeve 52 remain aligned with the flow direction of the flow line 190 at all times during operation of the valve 10.

Replacement of the Valve Cartridge

The components of the valve cartridge 50 may be replaced by using the displacing tool 184 shown in FIG. 19. Removing the valve cartridge 50 is basically a reversal of the steps followed to install the valve cartridge 50.

First, the valve 10 is turned off. Then the valve plug 86, the retainer seal 88, the retainer screw 84 and the retainer ring 80 are all removed. When the retainer screw 84 is removed, some fluid may leak out from above the valve cartridge 50 through the bleed-off bore 138 and threaded bore 118.

The displacing tool 184 is screwed into the second bore 38 of the second body portion 14 and the shaft 188 of the displacing tool 184 is driven upward until the displacing element 186 assumes the operating position of the valve cartridge 50. The stop 177 of the displacing tool 184 is set in a location on the shaft 172 to ensure the correct distance of travel for the shaft 172. It should be appreciated that the proper distance of travel for the shaft 172 varies according to the diameter of the flow line 190 being serviced.

At this point, the displacing element 186, rather than the valve cartridge 50, is interrupting the flow of the flow line 190. The bleed-off valve 179 of the displacing tool 184 is then opened to make sure that any fluid pressure in the first bore 26 is relieved. Any fluid pressure above the displacing element 186 is bled off through the displacing tool bore 189, into the housing chamber 168 and out the bleed-off valve 179 of the displacing tool 184.

The valve cap 56 is then removed and the valve cartridge 50 is extracted through the first bore 26. Any or all of the valve cartridge 50 components are replaced and the valve cartridge 50 is installed by reversing the steps just described for removal of the valve cartridge 50.

Changes may be made in the combinations, operations and arrangements of the various parts and elements described herein without departing from the spirit and scope of the invention as defined in the following claims.

What is claimed is:

1. A valve for installation on a fluid flow line, the valve comprising:

a valve body having first and second body portions defining therebetween a channel configured to receive a section of a flow line, said first body portion having a first bore communicating with the channel, said second body portion having a second bore communicating with the channel and opposing the first bore of the first body portion, said second body portion being adapted for removable attachment of a cutting tool to cut out the portion of the flow line located in the channel between the first bore and the second bore, wherein the attached cutting tool covers the second bore in a substantially fluid-tight seal;

a valve cartridge movable through the first bore between a withdrawn position wherein said valve cartridge is spaced a distance from the channel and an operating position wherein said valve cartridge extends across the channel;

means for securing said body portions together in a fluid-tight seal around the flow line;

a valve cap receiving a portion of said valve cartridge and covering the first bore in a fluid-tight seal; and a valve plug covering the second bore in a fluid-tight seal after the cutting tool is removed;

wherein said valve cartridge in the operating position is movable in response to actuation of said valve cartridge portion between an open position wherein said valve cartridge allows fluid flow therethrough and a shut-off position wherein said valve cartridge prevents fluid flow therethrough.

2. The valve of claim 1 wherein said valve cartridge further comprises:

a valve sleeve having a valve chamber and a pair of diametrically opposed flow openings substantially aligned with the flow of the line;

a valve cylinder having a flow bore extending transversely therethrough, said valve cylinder being matingly positioned for rotation within said valve sleeve; and a valve stem extending axially from one end of said valve cylinder and protruding from the first bore;

wherein rotation of said valve stem to position the flow bore of said valve cylinder into fluid communication with the flow openings of said valve sleeve allows fluid flow through said valve cartridge and wherein rotation of said valve stem to position the flow bore of said valve cylinder out of fluid communication with the flow openings of said valve sleeve prevents fluid flow through said valve cartridge.

3. The valve of claim 2 further comprising:

means for aligning the flow openings of said valve sleeve with the channel as said valve cartridge is moved from the withdrawn position into the operating position.

4. The valve of claim 2 further comprising:

means for preventing rotation of said valve sleeve when said valve cylinder is rotated.

5. The valve of claim 2 wherein said valve sleeve has an outer periphery with an upper circumferential groove above the flow openings, a lower circumferential groove below the flow openings and a pair of opposing side grooves extending between the upper and lower grooves perpendicular to the flow openings, and wherein the upper, lower and side grooves are adapted to receive elastomeric seals to prevent fluid leakage between said valve sleeve and said body portions.

6. The valve of claim 2 wherein said valve sleeve has an outer periphery with a medial circumferential recessed area extending above and below the flow openings, the recessed area being adapted to receive an elastomeric sleeve to prevent fluid leakage between said valve sleeve and said body portions.

7. The valve of claim 2 wherein said valve cartridge has a flow passage from said valve stem to the end of said valve cartridge opposite said valve stem for equalizing fluid pressure in the throughbore on each side of said valve sleeve and said valve cylinder.

8. The valve of claim 2 wherein said valve cylinder and said valve stem comprise stainless steel.

9. The valve of claim 2 wherein said valve sleeve comprises brass.

10. The valve of claim 1 wherein said body portions comprise brass.

11. The valve of claim 1 further comprising:

means for retaining said valve cartridge in the operating position after said valve cartridge is inserted into the operating position.

12. The valve of claim 1 further comprising:

means for equalizing fluid pressure on the first bore side and the second bore side of said valve cartridge as said valve cartridge is moved from the withdrawn position into the operating position.

13. A valve for installation on a fluid flow line, the valve comprising:

a valve body having first and second body portions defining therebetween a channel configured to receive a section of a flow line, said first body portion having a first bore communicating with the channel, said second body portion having a second bore communicating with the channel and opposing the first bore of the first body portion;

a valve cartridge movable through the first bore between a withdrawn position wherein said valve cartridge is spaced a distance from the channel and an operating position wherein said valve cartridge extends across the channel;

means for securing the first and second body portions together in a fluid-tight seal around the flow line;

a valve cap receiving a portion of said valve cartridge and being removably attached to the first body portion to cover the first bore in a fluid-tight seal;

a cutter tool removably attached to the second body portion while the flow line is being cut, said cutter tool covering the second bore in a substantially fluid-tight seal and adapted for cutting a portion of the flow line between the first bore and the second bore; and a valve plug removably attached to the second body portion while the valve is in operation, said valve plug covering the second bore in a fluid-tight seal;

wherein said valve cartridge in the operating position is movable in response to actuation of said valve cartridge portion between an open position wherein said valve cartridge allows fluid flow therethrough and a shut-off position wherein said valve cartridge prevents fluid flow therethrough.

14. A method of installing a valve on a pressurized fluid flow line, the steps of the method comprising;

providing a valve having a first body portion and a second body portion defining therebetween a channel adapted to receive a section of a fluid flow line, the first body portion having a first bore containing a valve cartridge and communicating with the channel, the valve also having a valve cap receiving a portion of said valve cartridge and covering the first bore in a fluid-tight seal, and the second body portion having a second bore opposing the first bore and communicating with the channel;

securing the first and second body portions together with a fluid flow line in the channel therebetween;

attaching a cutting tool having a rotary cutter to the second body portion in fluid-tight engagement with the second bore;

rotating and extending the rotary cutter through the second bore to cut out the portion of the fluid flow line between the second bore and the first bore;

withdrawing the rotary cutter form the channel;

moving the valve cartridge through the first bore into an operating position wherein the valve cartridge extends across the channel in fluid-tight engagement with the fluid flow line;

actuating the valve cartridge portion to position the valve cartridge into a shut-off position wherein the valve cartridge prevents fluid flow therethrough;

removing the cutting tool and the cut-out portion of the fluid flow line from the second bore; and securing a valve plug within the second bore to seal the second bore against fluid leakage;

wherein the valve cartridge in the operating position is movable in response to actuation of the valve cartridge portion between an open position wherein the valve cartridge allows fluid flow therethrough and a shut-off position wherein the valve cartridge prevents fluid flow therethrough.

15. The method of claim 14 further comprising the step of:

providing an equalizing bore through the valve cartridge to equalize fluid pressures in the channel and in the first bore as the valve cartridge is moved through the first bore into the channel.

16. The method of claim 15 further comprising the step of:

bleeding off fluid in the first bore and the second bore through the cutting tool after the valve cartridge is positioned in the shut-off position.

17. The method of claim 16 further comprising the step of:

installing a fluid-tight seal in the equalizing bore after bleeding off fluid in the first bore and the second bore.

18. The method of claim 17 further comprising the step of:

attaching a retainer to the second bore side of the valve cartridge to secure the valve cartridge in the operating position.

* * * * *